(12) United States Patent
Ince et al.

(10) Patent No.: US 11,473,628 B2
(45) Date of Patent: Oct. 18, 2022

(54) BEARING WITH AN INTEGRATED ELECTRICAL SHUNT

(71) Applicant: Schaeffler Technologies AG & Co. KG, Herzogenaurach (DE)

(72) Inventors: Marion Jack Ince, Mount Holly, NC (US); Venkata Kottapalli, Fort Mill, SC (US); Guihui Zhong, Charlotte, NC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/381,455

(22) Filed: Jul. 21, 2021

(65) Prior Publication Data

US 2022/0018399 A1    Jan. 20, 2022

Related U.S. Application Data

(62) Division of application No. 16/930,447, filed on Jul. 16, 2020, now Pat. No. 11,111,962.

(51) Int. Cl.
| | |
|---|---|
| *F16C 19/52* | (2006.01) |
| *F16C 41/00* | (2006.01) |
| *F16C 19/06* | (2006.01) |
| *H02K 11/40* | (2016.01) |
| *F16C 33/66* | (2006.01) |

(52) U.S. Cl.
CPC ............ *F16C 41/002* (2013.01); *F16C 19/06* (2013.01); *F16C 19/52* (2013.01); *F16C 33/6681* (2013.01); *H02K 11/40* (2016.01); *F16C 2380/26* (2013.01)

(58) Field of Classification Search
CPC ...... F16C 19/06; F16C 19/52; F16C 33/6659; F16C 33/6681; F16C 41/002; F16C 2380/26; H01R 39/26; H01R 39/39; H01R 39/643
USPC ................................ 310/90; 361/13, 56, 221
See application file for complete search history.

(56) References Cited

U.S. PATENT DOCUMENTS

| | | | |
|---|---|---|---|
| 3,271,723 A | 9/1966 | Willing | |
| 3,564,477 A | 2/1971 | Pompei | |
| 4,801,270 A | 1/1989 | Scarlata | |
| 7,136,271 B2 | 11/2006 | Oh et al. | |
| 7,193,836 B2 | 3/2007 | Oh et al. | |
| 7,339,777 B2 | 3/2008 | Barnard et al. | |
| 9,175,728 B2 | 11/2015 | White | |
| 9,790,995 B2* | 10/2017 | White | F16C 41/002 |
| 10,253,818 B1 | 4/2019 | Ince et al. | |
| 2006/0007609 A1 | 1/2006 | Oh et al. | |
| 2017/0276179 A1* | 9/2017 | Hutchison | F16C 33/583 |

(Continued)

FOREIGN PATENT DOCUMENTS

DE    102017123653 A1 *  4/2019  ............. F16C 19/52

*Primary Examiner* — Phillip A Johnson
(74) *Attorney, Agent, or Firm* — Kevin L. Parks

(57) ABSTRACT

A bearing includes an integrated electrical shunt. The shunt includes electrically conductive fibers sandwiched between two washers, at least one of which is electrically conductive. The fibers are fastened to the electrically conductive washer by electrically conductive epoxy. An outer shield protects the fibers. The outer shield is held to the washers by a drawn cup. The washers, the drawn cup, and the outer shield all have oil drain holes to allow lubricant to flow to the rollers.

13 Claims, 3 Drawing Sheets

(56) References Cited

U.S. PATENT DOCUMENTS

2019/0063500 A1\* 2/2019 Hart ............... F16J 15/3268
2020/0072288 A1\* 3/2020 Roman ............ F16C 33/784

\* cited by examiner

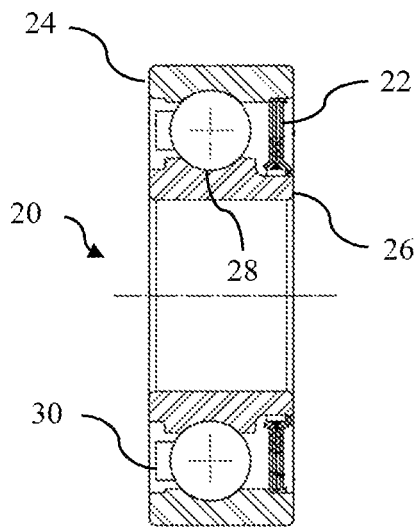
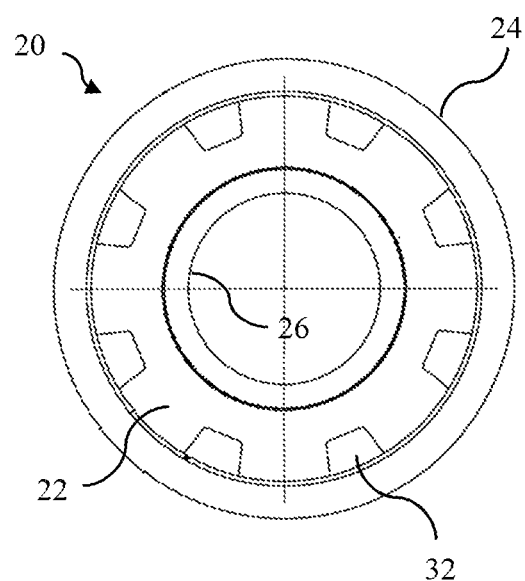
FIG. 1
FIG. 2
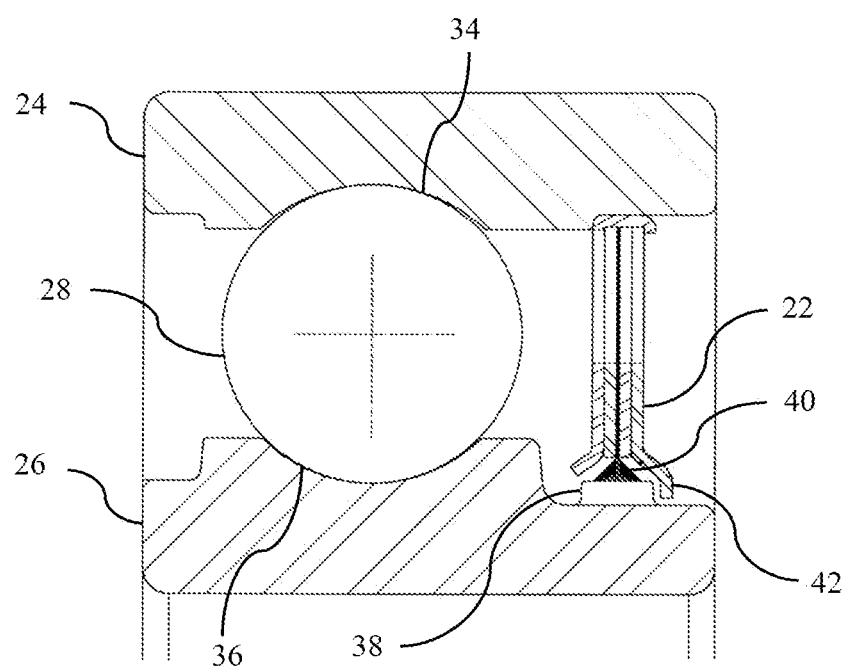
FIG. 3

BEARING WITH AN INTEGRATED ELECTRICAL SHUNT

CROSS-REFERENCE TO RELATED APPLICATIONS

This application is a divisional of the U.S. application Ser. No. 16/930,447 filed Jul. 16, 2020, the entire disclosure of which is incorporated by reference herein.

TECHNICAL FIELD

This disclosure pertains to the general field of electrical shunts. More particularly, the disclosure pertains to a ball bearing having an electrical shunt.

BACKGROUND

Bearing are commonly used to reduce parasitic drag between components that are intended to have relative rotation. Bearings commonly utilize rollers such as balls which maintain predominantly rolling contact, as opposed to sliding contact, with the two components. In some applications, such as electric motors, static electricity may build up on one of the components. In some cases, that can result in arcing through the rollers, damaging the bearing.

Some bearings are used in dry environments and are either permanently lubricated or lubricated only during periodic maintenance. In other applications, the bearings may be supplied with a flow of lubricant during operation. In these applications, pathways must be available for the lubricant to flow into and out of the bearing assembly.

SUMMARY

A bearing inner and outer rings, a plurality of rollers, and an electrical shunt. The outer ring defines an outer raceway. The inner ring defines an inner raceway. Each roller in the plurality of rollers contacts the inner and outer raceways. The electrical shunt has a plurality of electrically conductive fibers sandwiched between two washers. At least one of the washers is electrically conductive. The electrically conductive washer electrically connects to the fibers and to the outer ring. The electrically conductive washer may be electrically connected to the fibers by an electrically conductive adhesive. The fibers rub against the inner ring. The washers define a first plurality of oil holes between fibers such that lubricant can flow to the rollers. The inner ring may have a radially projecting riser axially offset from the inner raceway on which the fibers rub. The radially projecting riser may define a plurality of oil drain grooves spaced apart circumferentially from one another. The electrical shunt may also include an outer shield extending radially inward beyond the radially outer surface of the riser. The electrical shunt may also include a drawn cup having an outer flange extending around the two washers. The flange may be press fit to the outer ring to electrically connect the electrically conductive washer to the outer ring. The drawn cup may define a second plurality of oil holes aligned with the first plurality of oil holes.

An electrical shunt for a bearing includes an electrically conductive washer, a second washer, and a plurality of electrically conductive fibers. The electrically conductive washer has a first inner surface and defines a first plurality of oil holes. The second washer has a second inner surface and defining a second plurality of oil holes aligned with the first plurality of oil holes. The plurality of electrically conductive fibers are sandwiched between the electrically conductive washer and the second washer and extend radially inward beyond the first and second inner surfaces. The fibers are electrically connected to the electrically conductive washer by, for example, an electrically conductive adhesive. The electrical shunt may also include an outer shield extending radially inward beyond the fibers. The outer shield defines a third plurality of oil holes aligned with the first plurality of oil holes. The electrical shunt may also include a drawn cup having an outer flange extending around the washers and the outer shield. The drawn cup defines a fourth plurality of oil holes aligned with the first plurality of oil holes.

A method of manufacturing an electrical shunt includes winding electrically conductive fibers around a set of pins, fastening the fibers to a first washer with an adhesive, removing the first washer and the fibers from the pins, and fastening a second washer to the fibers. The fibers are sandwiched between the two washers and extend radially inwardly beyond an inner diameter of the first washer and an inner diameter of the second washer. Finally, the fibers are pierced to remove portions which extend more than a predetermined distance beyond the inner diameter of the first washer.

BRIEF DESCRIPTION OF THE DRAWINGS

FIG. 1 is a cross sectional view of a bearing with an integrated electrical shunt.

FIG. 2 is an end view of the bearing of FIG. 1.

FIG. 3 is a detail view of the bearing of FIG. 1.

DETAILED DESCRIPTION

Figure 4:
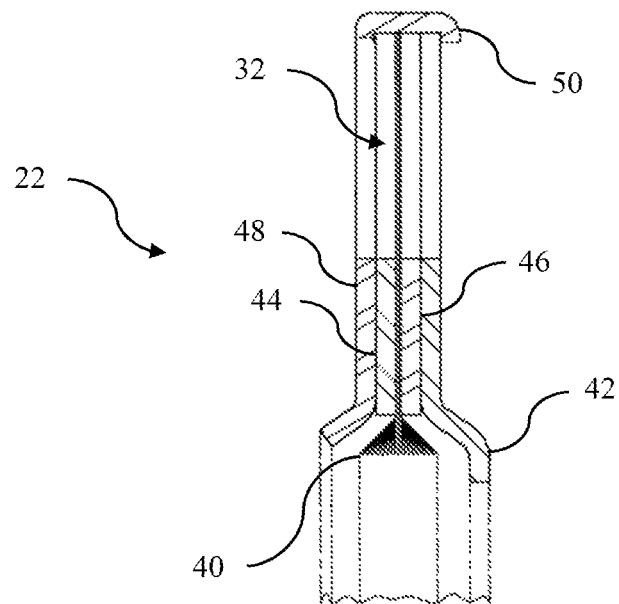
FIG. 4 is a cross sectional view of the electrical shunt of the bearing of FIG. 1.

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

FIGS. 1 and 2 show a bearing 20 with an integrated electrical shunt 22. FIG. 1 is a cross section while FIG. 2 is an end view. The bearing includes an outer ring 24 and an inner ring 26 separated by rollers 28. In this embodiment, the rollers are balls. The rollers are separated circumferentially by a cage 30. The electrical shunt 22 has a set of openings 32 to allow lubricant to flow to the rollers.

FIG. 3 is an enlarged view of the cross section of FIG. 1. Outer ring 24 defines an outer raceway 34 and inner ring 26 defines an inner raceway 36 in which balls 28 roll. Inner ring 26 also defines a riser 38 axially adjacent to the inner raceway 36. Electrical shunt 22 includes flexible, electrically conductive filaments 40 which rub against the riser 38. The electrical shunt 22 includes an outer shield 42 which extends radially inward past the filaments to protect the interface between the riser 38 and the filaments 40 from oil and debris.

FIG. 4 is a cross sectional view of the electrical shunt. The electrically conductive filaments 40 are situated between two washers 44 and 46. They may be retained, for example, by an electrically conductive adhesive such as an epoxy. The outer shield 42 is situated on one axial side and a drawn cup 48 is situated on the opposite axial side. An outer flanged edge 50 of the drawn cup may be bet over the two washers and the outer shield to hold the components together. At least washer 44 and drawn cup 48 are made of an electrically conductive material. Each of the layers includes a set of oil holes 32 which are aligned with the oil holes of the other layers such that lubricant can pass through the electrical shunt assembly.

Figures 5, 6:
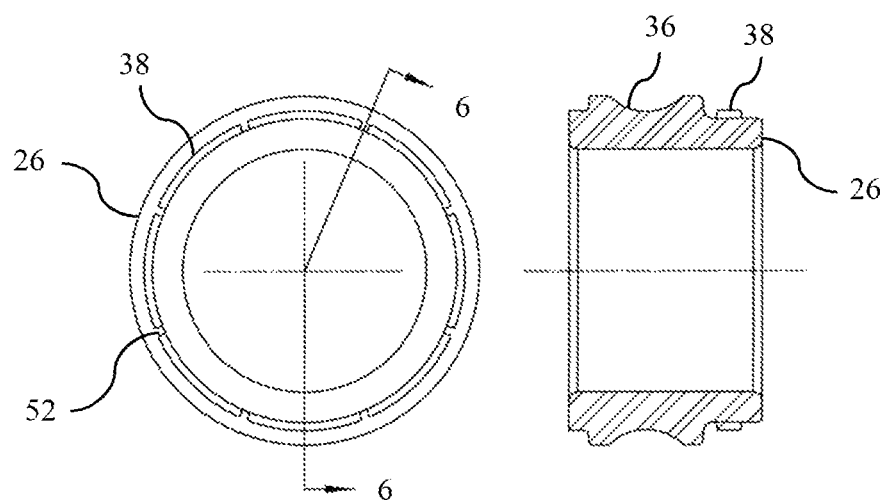
FIG. 5 is an end view of the inner ring of the bearing of FIG. 1.
FIG. 6 is a cross sectional view of the inner ring of FIG. 5.

FIGS. 5 and 6 show the inner ring by itself. FIG. 5 is an end view and FIG. 6 is a cross sectional view. A number of oil drain grooves 52 are formed around the perimeter of the riser 38. These allow oil to drain out of the filament 40 and riser 38 contacting area.

The electrical shunt electrically connects the inner ring to the outer ring while introducing very little parasitic drag.

Figure 7:
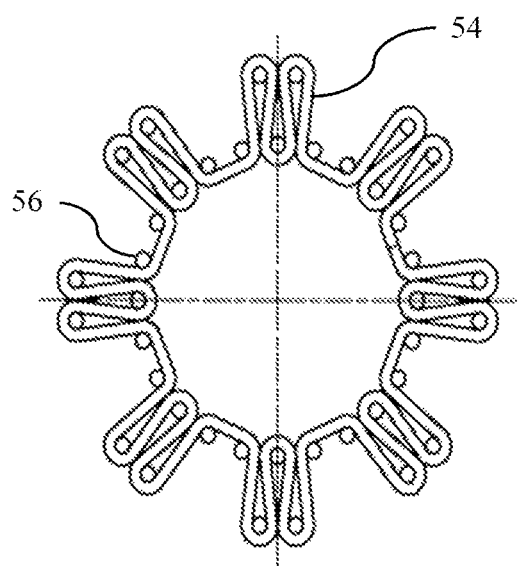
FIG. 7 is an illustration of a first step in a process of fabricating the electrical shunt of FIG. 4.
Figure 8:
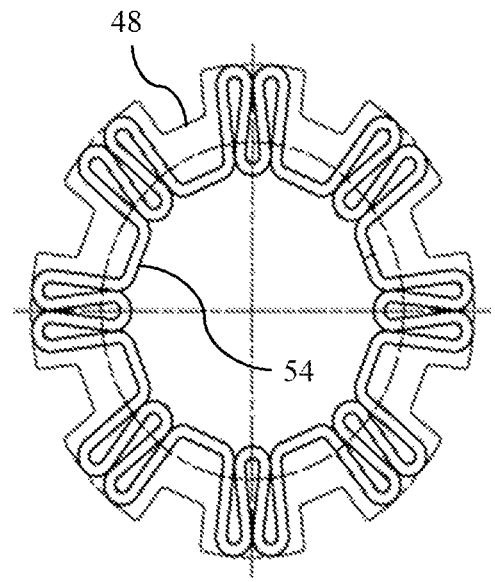
FIG. 8 is an illustration of a second step in a process of fabricating the electrical shunt of FIG. 4.
Figure 9:
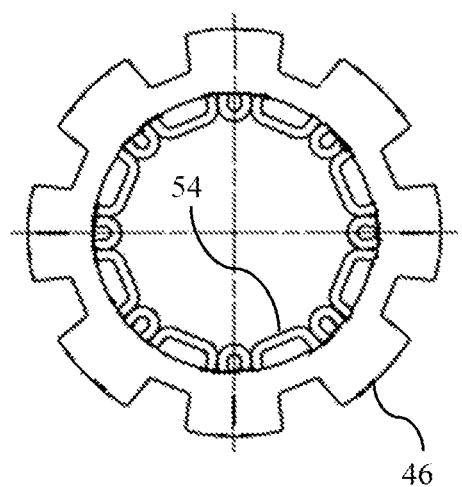
FIG. 9 is an illustration of a third step in a process of fabricating the electrical shunt of FIG. 4.
Figure 10:
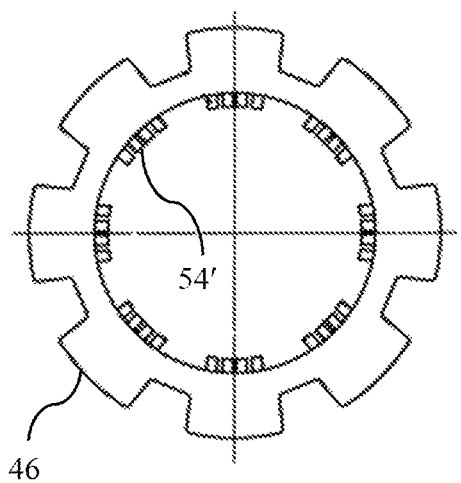
FIG. 10 is an illustration of a fourth step in a process of fabricating the electrical shunt of FIG. 4.

FIGS. 7 to 10 illustrate a process for manufacturing electrical shunt 22. In a first step, a strand of electrically conductive filaments 54 is wound around a set of pins 56 as shown in FIG. 7. Then. The filaments 54 are attached to a washer 48 using electrically conductive epoxy adhesive and removed from the pins 56, as shown in FIG. 8. A second washer 46 is attached to the filaments on an opposite axial side as illustrated in FIG. 9. Then, radially inwards ends of the filament are punched out as shown in FIG. 10 such that the cut filaments 54' have an inner radius slightly less than the outer radius of the riser 38. Finally, the outer shield 42 and drawn cup 48 are attached and the flange of the drawn cup is bent around the outer shield. The electrical shunt is inserted into the bearing after the inner ring, outer ring, rollers, and cage are assembled.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, to the extent any embodiments are described as less desirable than other embodiments or prior art implementations with respect to one or more characteristics, these embodiments are not outside the scope of the disclosure and can be desirable for particular applications.

What is claimed is:

1. A method of manufacturing an electrical shunt comprising:
    winding a plurality of electrically conductive fibers around a set of pins;
    fastening the fibers, with an adhesive, to a first washer;
    removing the first washer and the fibers from the pins;
    fastening a second washer to the fibers such that the fibers are sandwiched between the two washers and extend radially inwardly beyond an inner diameter of the first washer and an inner diameter of the second washer; and
    piercing the fibers to remove portions which extend more than a predetermined distance beyond the inner diameter of the first washer.

2. The method of claim 1 wherein fastening the second washer to the fibers occurs after removing the first washer and the fibers from the pins.

3. The method of claim 1 wherein piercing the fibers occurs after fastening the second washer to the fibers.

4. The method of claim 1 wherein the adhesive is electrically conductive.

5. The method of claim 1 wherein the first washer is electrically conductive.

6. The method of claim 1 wherein the second washer is electrically conductive.

7. The method of claim 1 further comprising:
    placing an outer shield on a first side of the shunt, the outer shield extending radially inward beyond the fibers;
    placing a drawn cup on a second side of the shunt; and
    bending a flange of the drawn cup around an outer edge of the outer shield to attach the outer shield and the drawn cup to the shunt.

8. A method of manufacturing a bearing comprising:
    winding a plurality of electrically conductive fibers around a set of pins;
    fastening the fibers, with an adhesive, to a first washer;
    removing the first washer and the fibers from the pins;
    fastening a second washer to the fibers such that the fibers are sandwiched between the two washers and extend radially inwardly beyond an inner diameter of the first washer and an inner diameter of the second washer;
    piercing the fibers to remove portions which extend more than a predetermined distance beyond the inner diameter of the first washer; and
    attaching a shunt to a bearing outer ring such that the fibers rub against a bearing inner ring.

9. The method of claim 8 further comprising:

placing an outer shield on a first side of the shunt, the outer shield extending radially inward beyond the fibers;

placing a drawn cup on a second side of the shunt; and bending a flange of the drawn cup around an outer edge of the outer shield to attach the outer shield and the drawn cup to the shunt.

10. The method of claim 9 wherein the flange of the drawn cup is press fit to the outer ring.

11. The method of claim 9 wherein the inner ring has a radially projecting riser axially offset from an inner raceway and the fibers rub on a radially outer surface of the riser.

12. The method of claim 11 wherein the radially projecting riser defines a plurality of oil drain grooves spaced apart circumferentially from one another.

13. The method of claim 12 wherein the outer shield extends radially inward beyond the radially outer surface of the riser.

\* \* \* \* \*